United States Patent [19]

Conrad

[11] Patent Number: 4,745,239

[45] Date of Patent: May 17, 1988

[54] MULTIPLE WIRE JOINING DEVICE AND METHOD

[75] Inventor: Richard A. Conrad, Vista, Calif.

[73] Assignee: Teledyne Industries, Inc., Los Angeles, Calif.

[21] Appl. No.: 905,741

[22] Filed: Sep. 9, 1986

[51] Int. Cl.[4] ...................... H02G 15/08; H01R 43/04

[52] U.S. Cl. .................................... 174/72 R; 29/861; 29/863; 174/71 R; 174/84 C; 174/94 R; 403/27; 403/285

[58] Field of Search ................. 174/71 R, 72 R, 84 C, 174/90, 94 R; 29/517, 861, 863; 403/284, 285, 274, 13, 14, 27

[56] References Cited

U.S. PATENT DOCUMENTS

| | | | |
|---|---|---|---|
| 2,729,695 | 1/1956 | Pierce | 174/84 C |
| 2,820,843 | 1/1958 | Dreher | 174/71 R |
| 3,072,989 | 1/1963 | Jugle et al. | 403/13 |
| 3,510,827 | 5/1970 | Spangler | 174/71 R |
| 3,962,901 | 6/1976 | Anderson et al. | 174/84 C X |
| 3,976,385 | 8/1976 | Klopfer | 174/84 C X |
| 4,114,344 | 9/1978 | Heasman | 403/27 X |
| 4,151,364 | 4/1979 | Ellis | 174/84 C |

FOREIGN PATENT DOCUMENTS

| | | | |
|---|---|---|---|
| 1201116 | 12/1959 | France | 174/84 C |

*Primary Examiner*—Morris H. Nimmo
*Attorney, Agent, or Firm*—Ronald W. Reagin; Stephen King

[57] ABSTRACT

A multiple wire joining device is disclosed which includes a generally tubular, deformable, electrically conductive housing having multiple apertures formed in the wall thereof. The apertures are axially spaced apart along the length of the housing and are each adapted to admit a wire therethrough so that it may entend axially along a length of the housing. The spacings between the apertures are sufficient to permit the admittance of a wire into the housing through each of the apertures a sufficient distance to enable the crimping of the housing adjacent each aperture to retain the respective wire therein.

6 Claims, 2 Drawing Sheets

MULTIPLE WIRE JOINING DEVICE AND METHOD

BACKGROUND OF THE INVENTION

This invention relates to electrical connectors, and more particularly, to a crimp-type connector for joining multiple wires.

Over the years a multitude of crimp-type solderless connectors have been devised for joining wires. In particular, deformable tubing has been used to form a splice between two wires. Examples of these devices are disclosed in U.S. Pat. No. 3,976,385, issued Aug. 24, 1976 to H. Klopfer; U.S. Pat. No. 2,729,695, issued Jan. 3, 1956 to F. Pierce; and U.S. Pat. No. 3,510,827, issued May 5, 1970 to P. Spangler.

Generally, prior art devices of the type described above are not suitable for joining more than two wires. Further, once two wires have been so joined, there is no way to join additional wires.

Accordingly, it is an object of the present invention to provide a new and improved device for joining multiple wires.

It is another object of the present invention to provide a device for joining three or more wires.

It is yet another object of the invention to provide a multiple wire joining device in which additional wires may be joined subsequent to the joining of first and second wires.

It is yet another object of the invention to provide a new method of joining multiple wires.

SUMMARY OF THE INVENTION

The foregoing and other objects of the invention are accomplished by providing a generally tubular, deformable, electrically conductive housing having multiple apertures formed in the wall thereof which are axially spaced apart along the length of the housing.

Each aperture is adapted to admit a wire therethrough and axially along a length of the housing. The spacings between the apertures are sufficient to permit the admittance of a wire into the housing through each of the apertures a sufficient distance to enable the crimping of the housing adjacent each aperture to retain the respective wire therein. Additional wires may also be inserted into the housing through end openings and retained therein by crimping the housing adjacent these openings.

Other objects, features and advantages of the invention will become apparent from a reading of the specification when taken in conjunction with the drawings in which like reference numerals refer to like elements in the several views.

DESCRIPTION OF THE PREFERRED EMBODIMENT

Figures 1, 2, 3:
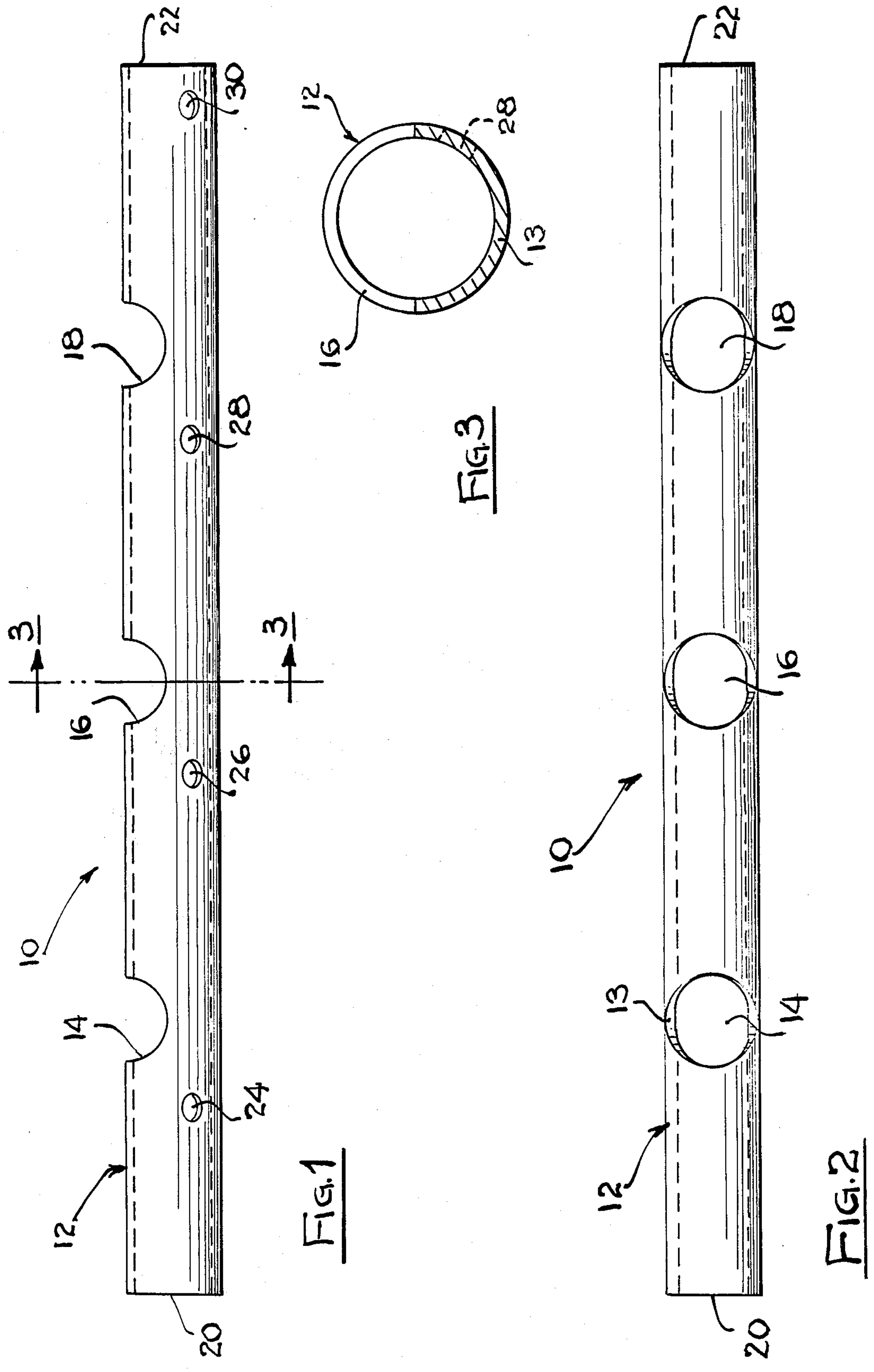
FIG. 1 is a side view of a multiple wire joining device constructed in accordance with the teachings of the invention.
FIG. 2 is a top view of the device of FIG. 1.
FIG. 3 is a cross-sectional view of the device of FIG. 1, taken along the line 3—3.

Referring to FIGS. 1, 2 and 3, there are shown side, top and cross-sectional views of a multiple wire joining device 10 constructed in accordance with the invention. The device 10 includes a tubular, electrically conductive housing 12 formed of a deformable material such as brass.

Generally semi-circular apertures 14, 16, 18 are provided in the wall 13 of the housing 12. These apertures are spaced apart along the length of the housing 12 and provide a passageway for a wire into the interior thereof. Preferrably, ends 20, 22 of the housing 12 are open and also provide a passageway for a wire into the interior of the housing 12. Inspection holes 24, 26, 28, 30 are provided in one side of the housing 12.

Figure 4:
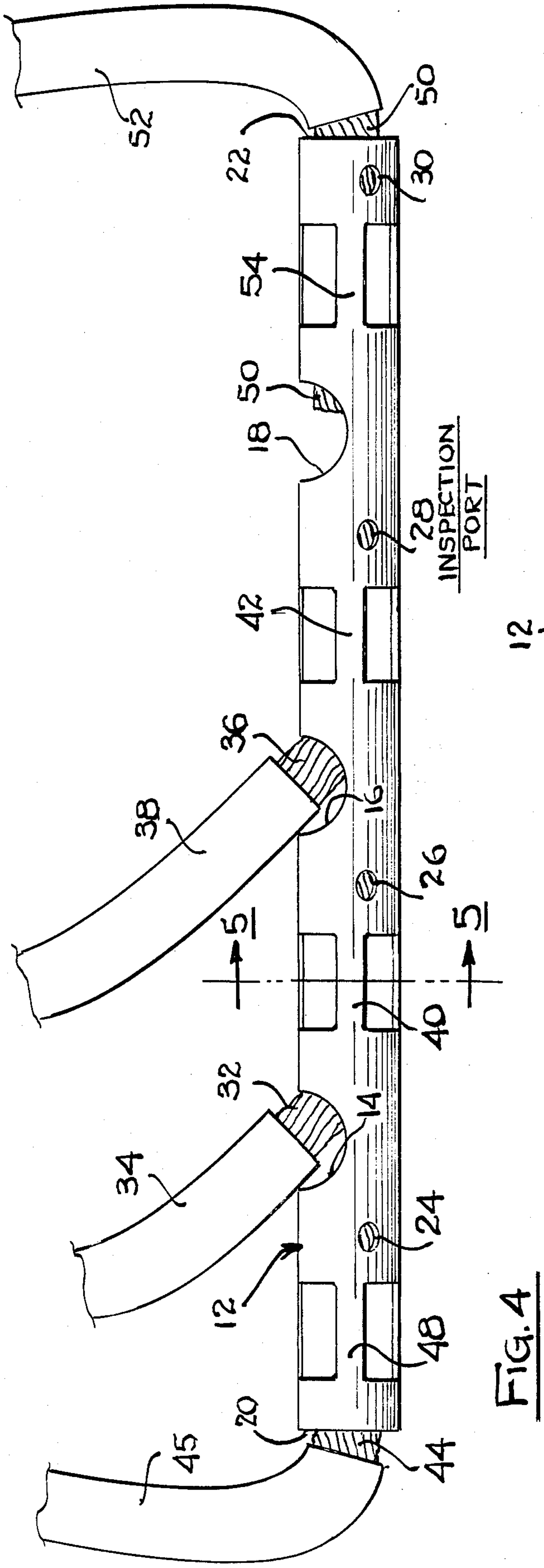
FIG. 4 is a side view of the device of FIG. 1 showing how it is used to join four wires.

FIG. 4 shows how the device 10 is used to join multiple wires. The inside diameter of the housing 12 is chosen to accommodate the particular gage of wire to be joined. Each of the apertures 14, 16, 18 is sized to permit one end of the wire to pass through that aperture and along a length of the housing 12. As shown in FIG. 4, an exposed end 32 of insulated stranded wire 34 fits through aperture 14 and extends along a length of the housing 12 to a point where it can be viewed through inspection hole 26.

In like manner, an exposed end 36 of a second insulated, stranded wire 38 fits through aperture 16 and extends along a length of the housing 12 to a point where is can be viewed through inspection hole 28. The spacing between successive apertures such as apertures 14, 16 is chosen so that the wire end (in this instance, end 32) can extend, without interfering with the wire end 36, a sufficient distance into the housing 12 to be crimped at a location 40 adjacent the aperture 14 in order to retain the wire 34 therein. Hole 26 is located to permit viewing the end 32 to ensure it has been positioned sufficiently far into the housing 12 to effect a satisfactory crimp joint.

Figure 5:
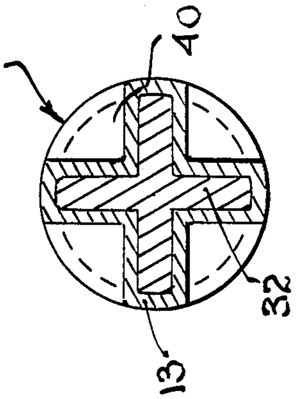
FIG. 5 is a cross-sectional view of the assembly of FIG. 4, taken along the line 5—5, and showing the crimped housing.

The housing 12 may be crimped in a number of configurations well known to those skilled in the art to effect a suitable mechanical and electrical connection. FIGS. 4 and 5 depict a cross-type crimp geometry used to fasten the wire end 32 at location 40, as well as to fasten wire end 36 at location 42, using inspection hole 28 for wire positioning.

It will be appreciated from the above description that a large number of apertures may be provided in the housing 12 by simply extending its length, to effect the joining of a large number of wires. Further, additional wires may be joined to the housing 12, even after other wires have been crimped in place, simply by inserting these additional wires into unoccupied apertures, and crimping them in place.

FIG. 4 also shows how additional wires may be joined to the ends 20, 22 of the housing 12. By spacing the apertures 14, 18 a sufficient distance from these ends, a wire end 44 of an insulated wire 46 may be inserted in open end 20 a sufficient distance, as verified by hole 24, to effect a crimp at location 48, while avoiding interference with wire end 32.

In similar fashion, a wire end 50 of an insulated wire 52 may be inserted in open end 22 a distance sufficient to effect a crimp at location 54, while avoiding interference with wire end 16. In this instance, unoccupied aperture 18 serves as an inspection opening to verify sufficient insertion of the end 50 to insure a reliable crimp. The opening 30 would be used for inspection purposes if the wire 50 was inserted through the aperture 18, instead of the end 22. When all wires have been joined to the housing 12, heat shrinkable tubing may be used to electrically insulate the housing 12 in a manner well known to those skilled in the art.

By way of example, the construction of a device 10 for terminating four 20 gage stranded wires in the configuration of FIG. 4 might have the following dimensions. The inner diameter of the housing 12 is 0.043 inches; the apertures 14, 16, 18 are about 0.043 inches wide by 0.12 inches long, and are spaced apart 0.360 inches. The overall length of the housing is 1.31 inches.

While there has been shown and described a preferred embodiment of the invention, it is to be understood that various other adaptations and modifications may be made within the spirit and scope of the invention. For example, while the embodiment described above employs a cylindrical housing and generally semi-circular apertures, other geometries such as a rectangular housing and rectangular apertures may be used as well. Extrusion as well as metal rolling processes may be used to form the housing. Further, the housing may be fabricated with closed ends, if desired, whereby only the side apertures are used for wire entry. It is thus intended that the invention be limited in scope only by the appended claims.

What is claimed is:

1. A device for joining multiple wires, comprising:

a generally tubular, deformable, electrically conductive housing having multiple apertures formed in the wall thereof and axially spaced apart along the length of the housing, each said aperture adapted to admit one end of one of the multiple wires through the aperture and axiallly along a length of the housing, where the spacings between the apertures are sufficient to permit the admittance of the one end of the one wire into the housing through any one of the apertures a sufficient distance to enable the housing adjacent each said aperture to be crimped to retain the respective wire therein and where the one end of each of the multiple wires terminates in the housing.

2. The device for joining multiple wires of claim 2 in which the housing further includes inspection openings spaced along the length of the housing at points which enable the viewing of the wires to be admitted into the housing to ascertain that they are admitted a sufficient distance to enable the crimping thereof.

3. A method of joining multiple wires, comprising the steps of:

providing a generally tubular, deformable, electrically conductive housing having multiple apertures formed in the wall thereof and axially spaced apart along the length of the housing, each aperture adapted to admit one end of one of the multiple wires through the aperture and axially along a length of the housing where the spacings between the apertures are sufficient to permit the admittance of the one end of the one wire into the housing through any one of the apertures a sufficient distance to enable the crimping of the housing adjacent each aperture to retain the respective wire therein;

positioning each of the wires into the housing through a respective said aperture the sufficient distance to enable their retention by crimping the housing; and crimping the housing adjacent each of the apertures to retain the wires in the housing where the one end of each of the multiple wires terminates in the housing.

4. A device for joining three or more wires, comprising:

a generally tubular, deformable, electrically conductive housing having first and second end openings, each adapted for the admittance of one end of first and second wires, and having at least one aperture formed in the wall of the housing and axially spaced from the first and second end openings, the aperture adapted for the admittance of one end of a third wire through the aperture and axially along a length of the housing where the spacings between the aperture and the first and second end openings are sufficient to permit the admittance into the housing of the one end of the first and second wires a sufficient distance to enable the housing adjacent said end openings to be crimped to retain said first and second wires therein, while also permitting the admittance into the housing of the one end of the third wire a sufficient distance to enable the crimping of the housing adjacent said aperture to retain the third wire therein and where the one end of each of the wires terminates in the housing.

5. The device of claim 4 in which the housing further includes inspection openings spaced along the length of the housing at points which enable the viewing of the wires to be admitted into the housing to ascertain that they are admitted a sufficient distance to enable the crimping thereof.

6. A method of joining three or more wires, comprising the steps of:

providing a generally tubular, deformable, electrically conductive housing having first and second end openings, each adapted for the admittance of one end of first and second wires, and having at least one aperture formed in the wall of the housing and axially spaced from the end openings, the aperture adapted for the admittance of one end of a third wire through the aperture and axially along a length of the housing where the spacings between the aperture and the end openings are sufficient to permit the admittance into the housing of the one end of the first and second wires a sufficient distance to enable the housing adjacent said end openings to be crimped to retain said first and second wires therein, while also permitting the admittance into the housing of the one end of the third wire a sufficient distance to enable the crimping of the housing adjacent said aperture to retain the third wires therein;

positioning the one ends of the first, second and third wires into the first and second end openings and the aperture, respectively, the sufficient distance to enable their retention by crimping the housing;

and crimping the housing adjacent the end openings and the aperture to retain each of the wires therein where the one end of each of the wires terminates in the housing.

* * * * *